United States Patent [19]

Wolf et al.

[11] Patent Number: 5,246,214
[45] Date of Patent: Sep. 21, 1993

[54] CIRCUMFERENTIALLY LOADED SHOCK-ABSORBING RUBBER BLOCK

[75] Inventors: Franz J. Wolf; Hubert Pletsch, both of Bad Soden-Salmünster, Fed. Rep. of Germany

[73] Assignee: WOCO Franz-Josef Wolf & Co., Bad Soden-Salmunster, Fed. Rep. of Germany

[21] Appl. No.: 948,623

[22] PCT Filed: Dec. 20, 1989

[86] PCT No.: PCT/EP89/01577
§ 371 Date: Aug. 22, 1990
§ 102(e) Date: Aug. 22, 1990

[87] PCT Pub. No.: WO90/07069
PCT Pub. Date: Jun. 28, 1990

Related U.S. Application Data

[63] Continuation of Ser. No. 572,982, Aug. 22, 1990, abandoned.

[30] Foreign Application Priority Data

Dec. 22, 1988 [DE] Fed. Rep. of Germany ....... 3843321

[51] Int. Cl.$^5$ ................................................. F16F 1/36
[52] U.S. Cl. ..................................... 267/153; 267/145; 267/292; 248/621; 248/638
[58] Field of Search ............... 267/136, 140.11, 140.5, 267/141, 141.2, 145, 153, 189, 201, 279, 292–294; 248/609, 621, 638

[56] References Cited

U.S. PATENT DOCUMENTS

| | | | |
|---|---|---|---|
| 2,371,788 | 3/1945 | Weeber | 267/145 |
| 2,837,180 | 6/1958 | Armstrong | 188/264 R |
| 3,191,896 | 6/1965 | Nathan | 267/153 |
| 3,396,925 | 8/1968 | Dickie et al. | 248/634 |
| 4,542,996 | 9/1985 | Brissette et al. | 267/293 X |
| 4,750,720 | 6/1988 | Wolf et al. | 267/140.1 R X |
| 4,776,573 | 10/1988 | Wolf et al. | 267/140.1 |
| 4,781,365 | 11/1988 | Harrison | 267/294 |
| 4,895,115 | 1/1990 | Weber et al. | 267/141.3 X |
| 4,925,163 | 5/1990 | Wolf et al. | 267/153 |
| 5,014,967 | 5/1991 | Wolf et al. | 267/153 |

FOREIGN PATENT DOCUMENTS

| | | | |
|---|---|---|---|
| 2446186 | 4/1976 | Fed. Rep. of Germany | 267/152 |
| 0889983 | 12/1981 | U.S.S.R. | 464/180 |

Primary Examiner—Robert J. Oberleitner
Assistant Examiner—Josie A. Ballato
Attorney, Agent, or Firm—Lowe, Price, LeBlanc & Becker

[57] ABSTRACT

A rubber block is shaped as a segment of a circular washer wherein opposite ends of the segment are surfaces against which torsional forces are applied to the blocks. A plurality of hollow ducts extend through the block and all the ducts are parallel to each other and essentially perpendicular to a main plane of the block. The main plane is perpendicular to the load bearing surfaces. The hollow ducts are intersected by cavities having cross-sectional areas larger than the corresponding cross-sectional areas of the ducts intersecting these cavities.

11 Claims, 1 Drawing Sheet

CIRCUMFERENTIALLY LOADED SHOCK-ABSORBING RUBBER BLOCK

This application is a continuation of application Ser. No. 07/572,982 filed Aug. 22, 1990, now abandoned.

TECHNICAL FIELD

The invention concerns a shock absorbing rubber block.

BACKGROUND ART

A rubber body is known from the German Gebrauchsmuster DE 85 35 344 U1, wherein a block is crossed by cylindrical or prismatic ducts which pass through cavities formed inside the block. The largest inside cross-section of these cavities when seen perpendicularly to the axis of the ducts crossing it is larger than the duct cross-section in this plane. The duct axes are located at the centers of the essentially and at least approximately spherical cavities. The cavities and the ducts are arranged in such a way that at least two spatially crossing, though not intersecting, sets of mutually parallel ducts cross this block.

This known rubber block serves as a rest or thrust bearing, the grid planes formed by the cavities and ducts being transverse, in particular perpendicular to the vector of a load which must have shock-absorption.

Rubber blocks of this kind are characterized by a great depth of penetration, that is by an extremely compliant spring characteristic line, with high mechanical strength and extensive, and in practice as a rule complete acoustic de-coupling between the rest and its own base.

While such a rubber body may be considered nearly ideal with respect to spring and acoustic characteristics, design limits nevertheless are set on it on account of the required array of grid planes formed by the cavities and ducts perpendicularly to the load vector.

SUMMARY OF THE INVENTION

The object of the invention is to so improve a rubber body or block such that a rubber spring also may serve in those elastic problems where the load vector may not be axial and perpendicular to the grid planes of at least two spatially crossing though not intersecting sets of mutually parallel ducts.

This problem is solved by the invention by a rubber block comprising a block shaped to include at least a segment of a circular washer having at least one load bearing surface disposed at at least one end of the segment. A plurality of hollow ducts are regularly distributed in the block and essentially all of which ducts in the block are mutually parallel to each other and essentially perpendicular to a main plane of the block. The main plane is essentially perpendicular to said at least one bearing surface. The hollow ducts intersect cavities regularly distributed through the block. The cavities have a cross-sectional area in a direction perpendicular to the longitudinal axis of the associated duct which is larger than the corresponding cross-sectional area of the hollow ducts intersecting said cavities.

The hollow ducts are circumferentially spaced from each other and arrayed along imaginary concentric circular segments.

A spring body of this kind may be loaded circumferentially or peripherally, in other words it is applicable wherever torsional elasticity must be provided. Surprisingly, the rubber block of the invention evinces the same properties of high mechanical strength in the presence of a compliant spring characteristic line and nearly perfect acoustic de-coupling as do the known, axially loaded grid rubber or spring block. The characterization of "compliant" or the feature of "great depth of penetration" refers to the torsion angle.

The cavities may be shaped as spheres arrayed inside the block in a spatially regular manner and staggered relative to one another as a spaced center grid wearing to the outside. Each hollow duct may cross at least three cavities. At least one load-bearing surface may also define at least one radially extending mounting surface extending toward the main axis of the block. A rigid, load-absorbing plate may be located adjacent the said mounting surface.

BEST MODE FOR CARRYING OUT THE INVENTION

Figure 1:
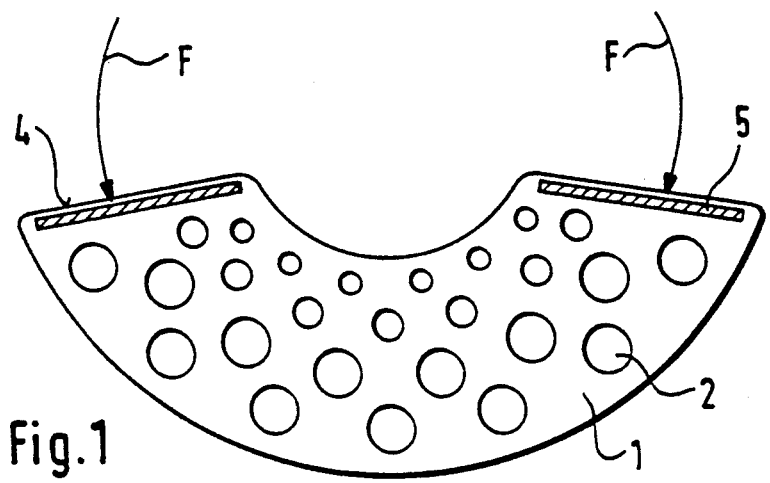
FIG. 1 is a top view of one of the two surfaces in the main radial plane of the rubber block.

As shown by FIG. 1, the rubber block 1 assumes the shape of a cylindrical washer segment. The rubber block 1 is crossed axially by a set of bilaterally open, hollow ducts 2 which in turn cross spherical cavities 3 in such manner that the axes of the ducts 2 intersect the origins of the cavities 3. The cavities 3 are so distributed through the block 1 that they are equidistant from each other on the ducts crossing them and also so they are staggered from duct to adjacent duct. The rest or load bearing surfaces 4 of the rubber block 1 are reinforced by a steel plate 5 vulcanized into the block tightly below the surface in order to better and more homogeneously absorb the load. The spring block is loaded circumferentially, that is it is a torsion load, in the direction of the curved vectors F.

Figure 2:
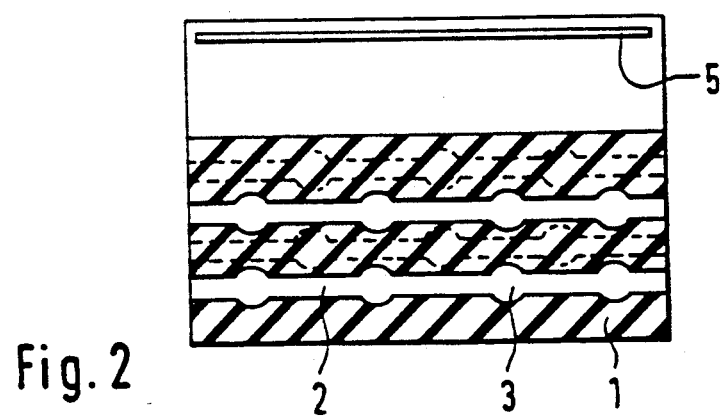
FIG. 2 is an axial section through an alternate embodiment of a rubber block having an axial cross-section of the block depicted in FIG. 1 and taken through a main radial plane.

The alternate embodiment of a rubber block depicted in FIG. 2 only differs from the FIG. 1 embodiment in that the cross-section of the hollow ducts 2 and of the cavities 3 remain constant in the radially outward direction of the segment.

The surface of the rubber block 1 is provided with improved sliding properties, in this case by being fluorinated.

The rubber block shown in FIGS. 1 and 2 may be used in matching bearing cases in particular to make compliant, torsional couplings where acoustic de-coupling between the input shaft and the output shaft is demanded from such coupling at high torsional compliance.

We claim:

1. A rubber block, comprising a block shaped to include at least a segment of a circular washer having at least one generally radially extending load bearing surface disposed at at least one end of said segment, said load bearing surface adapted to receive a circumferential load acting thereagainst, a plurality of hollow ducts regularly distributed in the block and all of which ducts in the block have longitudinal axes which are respectively mutually parallel to each other and essentially perpendicular to a main plane of the block, which main plane is essentially perpendicular to said at least one load bearing surface, wherein said hollow ducts intersect cavities regularly distributed through the block, said cavities having a cross-sectional area in a direction perpendicular to the longitudinal axis of the associated duct which is larger than a corresponding cross-sectional area of the hollow ducts intersecting said cavities.

2. Rubber block defined in claim 1, wherein the hollow ducts are circumferentially spaced from each other and arrayed along imaginary concentric circles.

3. Rubber block defined in claim 3, wherein the hollow ducts arrayed in one of the imaginary concentric circles are staggered relative to the ducts arrayed in an imaginary adjacent concentric circle.

4. Rubber block defined in claim 1, wherein the cross-sections of the hollow ducts and of the cavities remain constant in the radially outer direction of the segment.

5. Rubber block defined in claim 1, wherein the cavities are shaped as spheres arrayed inside the block in a spatially regular manner and staggered relative to one another as a space-centered grid flaring in a radially outward direction of the block.

6. Rubber block defined in claim 1, wherein each hollow duct crosses at least three cavities.

7. Rubber block defined in claim 1, wherein said at least one load bearing surface also defines at least one radially extending mounting surface extending toward a main axis of the block.

8. Rubber block defined in claim 7, further including a rigid, load-absorbing plate located adjacent said mounting surface.

9. Rubber block defined in claim 1, wherein external surfaces of the block are fluorinated.

10. The rubber block of claim 1, wherein said at least one end of said segment extends in a radial plane.

11. A rubber block comprising a block shaped to include at least a segment of a circular washer having at least one load bearing surface disposed at at least one ed of said segment, a plurality of hollow ducts regularly distributed in the block and which ducts are essentially perpendicular to a main plane of the block, which main plane is essentially perpendicular to said at least one load bearing surface, wherein said hollow ducts intersect cavities regularly distributed through the block, said cavities having a cross-sectional area in a direction perpendicular to the longitudinal axis of the associated duct which is larger than a corresponding cross-sectional area of the hollow ducts intersecting said cavities, wherein the hollow ducts are circumferentially spaced from each other and arrayed along imaginary concentric circles, and wherein the cross-sectional areas of the hollow ducts and of the cavities in the rubber block increase in size in the radially outward direction of the block.

* * * * *